US012777447B2

(12) United States Patent
Nayak et al.

(10) Patent No.: US 12,777,447 B2
(45) Date of Patent: Oct. 27, 2026

(54) METHOD AND APPARATUS TO SELECT CORRECT SMF FOR SNPN UE'S ONBOARDING

(71) Applicant: Samsung Electronics Co., Ltd., Gyeonggi-do (KR)

(72) Inventors: Ashok Kumar Nayak, Bangalore (IN); Youngkyo Baek, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 335 days.

(21) Appl. No.: 18/565,347

(22) PCT Filed: Jul. 27, 2022

(86) PCT No.: PCT/KR2022/011000
§ 371 (c)(1),
(2) Date: Nov. 29, 2023

(87) PCT Pub. No.: WO2023/008892
PCT Pub. Date: Feb. 2, 2023

(65) Prior Publication Data

US 2024/0267869 A1 Aug. 8, 2024

(30) Foreign Application Priority Data

Jul. 27, 2021 (IN) ............................. 202141033709
Apr. 22, 2022 (IN) ............................. 202141033709

(51) Int. Cl.
*H04W 60/00* (2009.01)
*H04W 48/08* (2009.01)

(52) U.S. Cl.
CPC ........... *H04W 60/00* (2013.01); *H04W 48/08* (2013.01)

(58) Field of Classification Search
None
See application file for complete search history.

(56) References Cited

U.S. PATENT DOCUMENTS

2018/0270778 A1* 9/2018 Bharatia ............. H04L 65/1073
2021/0058784 A1* 2/2021 Kedalagudde ........ H04W 76/12
2022/0150683 A1 5/2022 Zhou et al.

FOREIGN PATENT DOCUMENTS

EP 3 986 007 4/2022
WO WO 2021/012736 1/2021
WO WO 2021/134107 7/2021

OTHER PUBLICATIONS

PCT/ISA/210 Search Report dated Oct. 27, 2022, issued on PCT/KR2022/011000, pp. 3.

(Continued)

*Primary Examiner* — Frantz Bataille
(74) *Attorney, Agent, or Firm* — The Farrell Law Firm, P.C.

(57) ABSTRACT

The disclosure relates to a 5G or 6G communication system for supporting a higher data transmission rate. Embodiments herein provide a method for selecting correct SMF for SNPN onboarding of a UE (100) by a NRF apparatus (300). The method includes receiving a NF profile from a SMF apparatus of a plurality of SMF apparatuses (400*a* and 400*b*). Further, the method includes receiving a discovery message for SMF supporting the SNPN Onboarding service and at least one of DNN service and S-NSSAI service from an AMF apparatus (200). Further, the method includes selecting the at least one apparatus of the plurality of SMF apparatuses (400*a* and 400*b*) supporting the SNPN Onboarding service and at least one of the DNN service and the S-NSSAI service based on the NF profile received from each SMF sever of the plurality of SMF apparatuses (400*a* and 400*b*). Further, the method includes sending the at least one selected SMF apparatus to the AMF apparatus (200).

15 Claims, 9 Drawing Sheets

(56) References Cited

OTHER PUBLICATIONS

PCT/ISA/237 Written Opinion dated Oct. 27, 2022 , issued on PCT/KR2022/011000, pp. 4.
3GPP TS 23.501 V17.1.1 (Jun. 2021), pp. 526.
Huawei, Hisilicon, "eSBA: SMF selection", 3GPP TSG-SA2 Meeting #132 S2-1903557 Xi'an, China, Apr. 8-Apr. 12, 2019, pp. 4.
Ericsson, NTT Docomo, Sprint, Inter Digital, Oracle, "eSBA communication schemas related to SMF discovery and selection", 3GPP TSG-SA WG2 Meeting #130 S2-1901591 Jan. 21-25, Kochi, India, pp. 3.
Ericsson, NTT Docomo, Sprint, Inter Digital, Oracle, "eSBA communication schemas related to SMF discovery and selection", 3GPP TSG-SA WG2 Meeting #130 S2-1901263 Jan. 21-25, Kochi, India, pp. 3.
Huawei, HiSilicon, "Clarification for UE Onboarding and UE Access with CH Credentials", S2-2108096, 3GPP TSG-WG SA2 Meeting #147E e-meeting, Oct. 18-22, 2021, 11 pages.
3GPP TR 23.700-07 V17.0.0 (Mar. 2021), pp. 248.
3GPP TS 23.502 V17.1.0 (Jun. 2021), pp. 692.
3GPP TS 23.502 V17.5.0 (Jun. 2022), pp. 744.
European Search Report dated Sep. 24, 2024 issued in counterpart application No. 22849868.9-1215, 24 pages.

* cited by examiner

[Fig. 1]
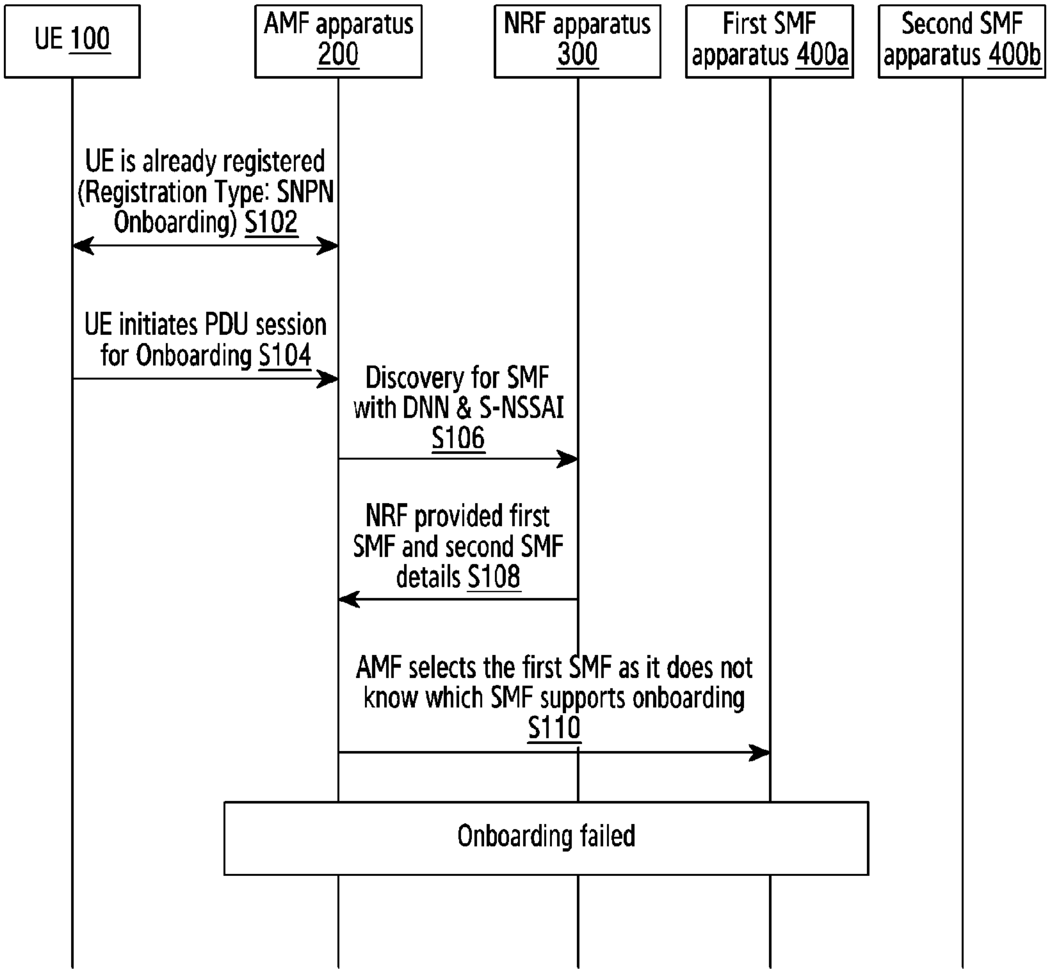

[Fig. 2]
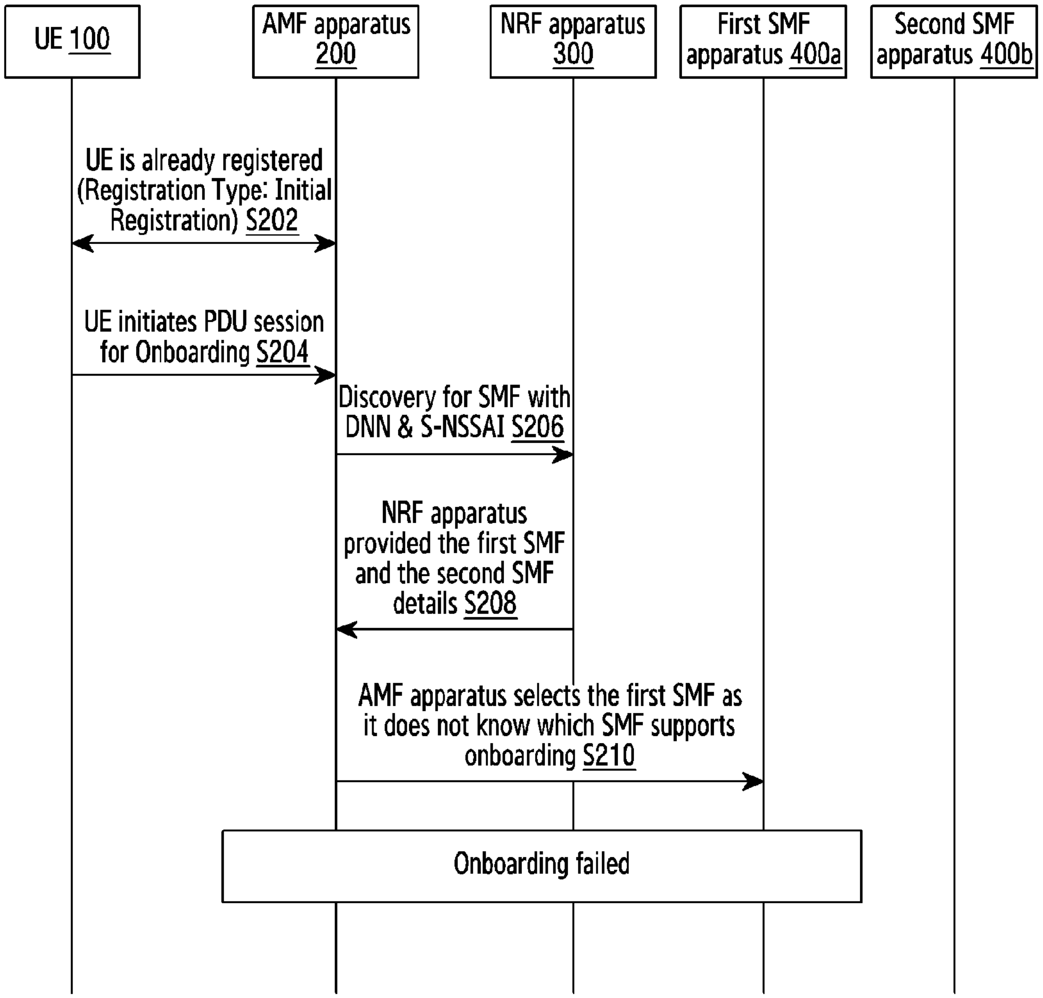

[Fig. 3A]
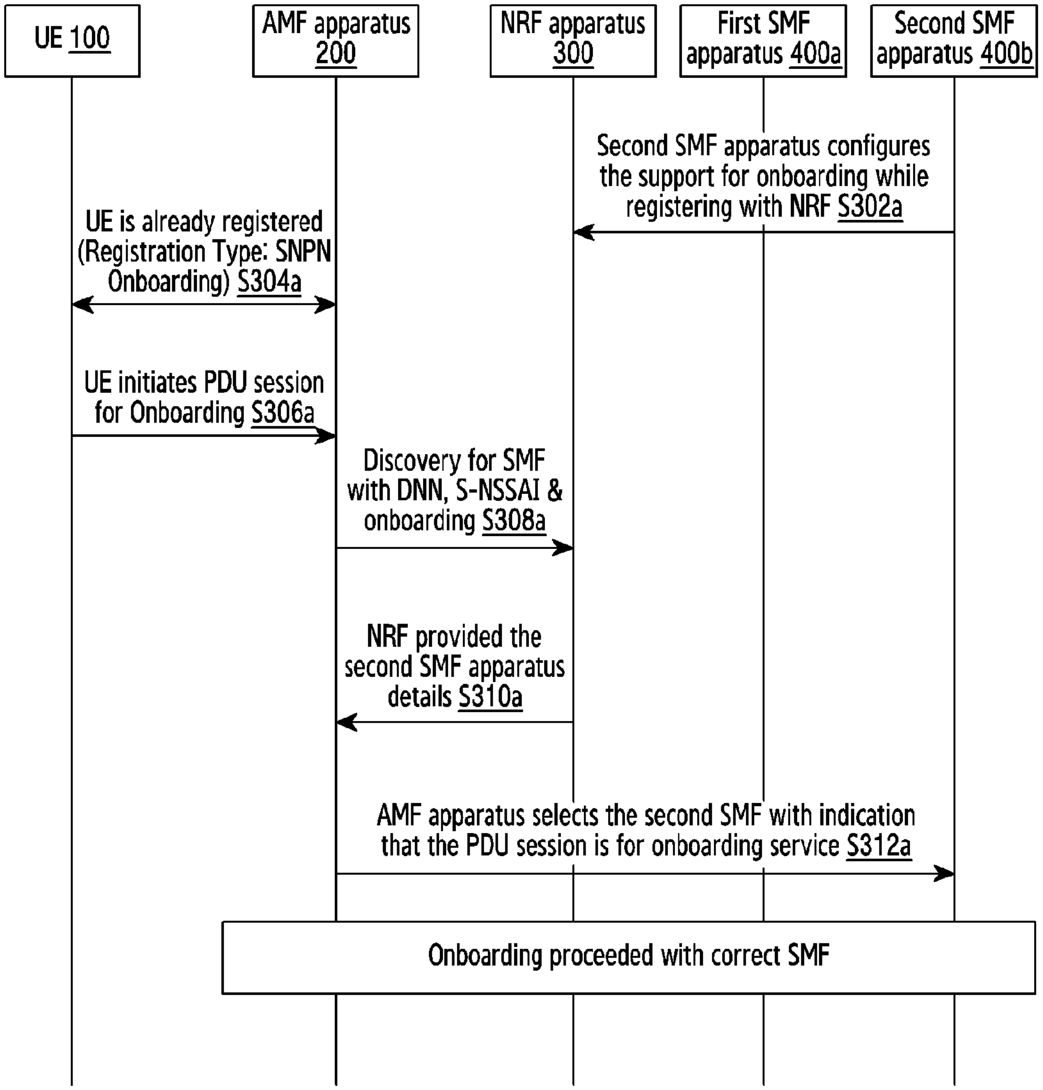

[Fig. 3B]
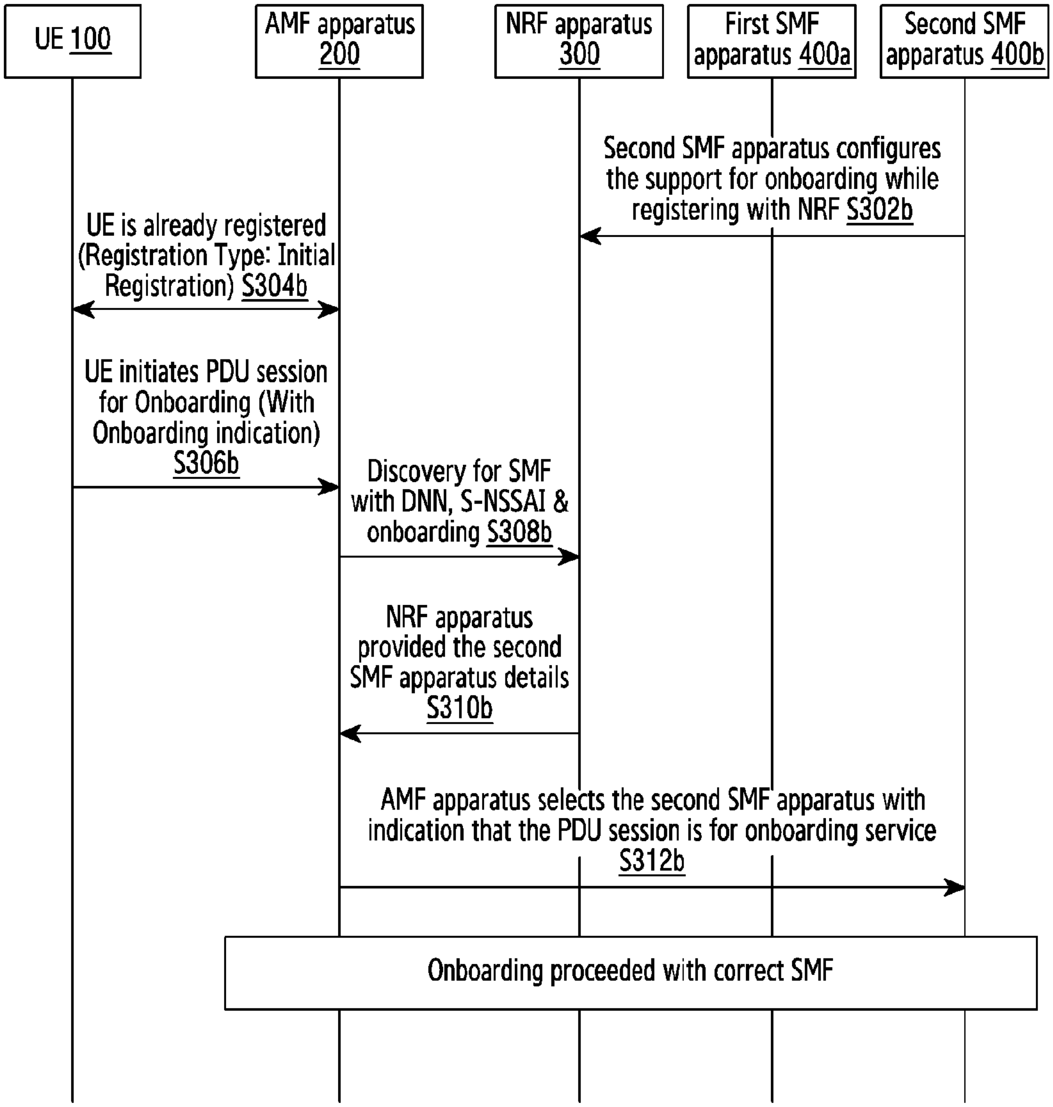
[Fig. 4]
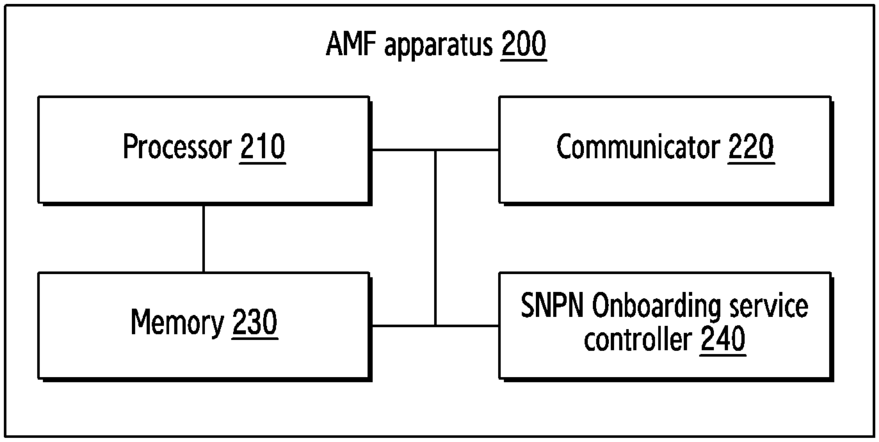

[Fig. 5]
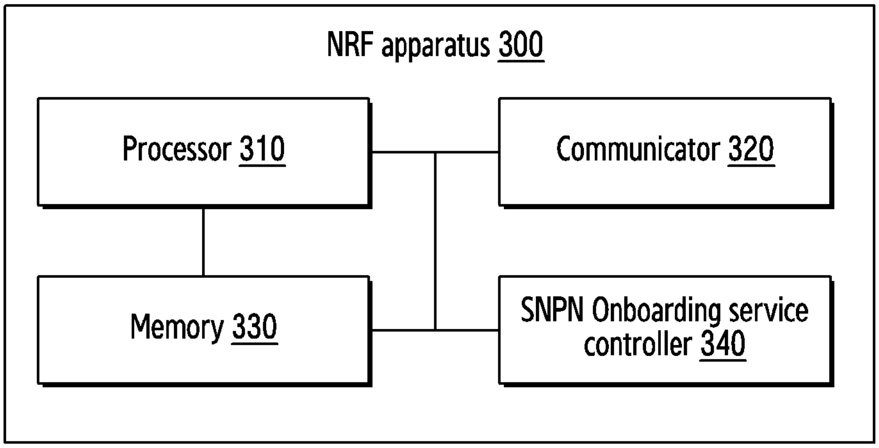
[Fig. 6]
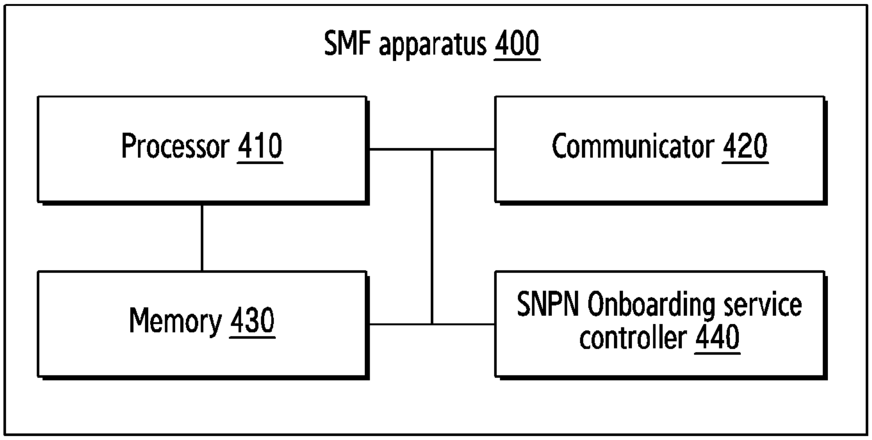

[Fig. 7]
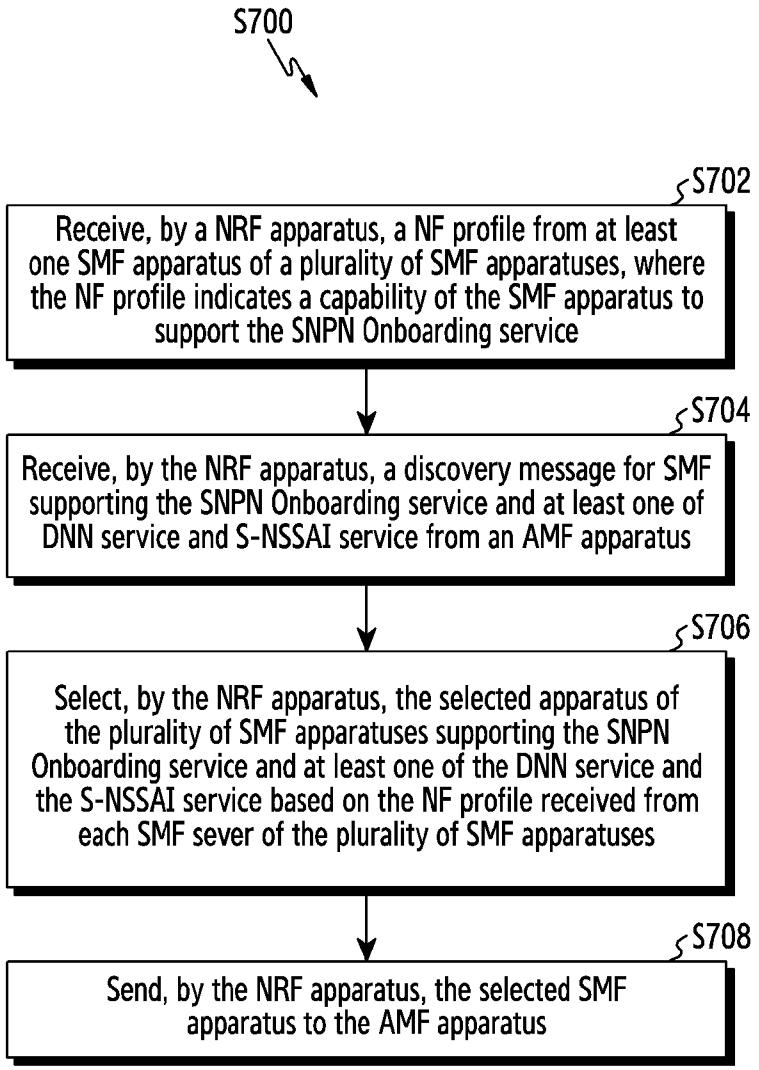

[Fig. 8]
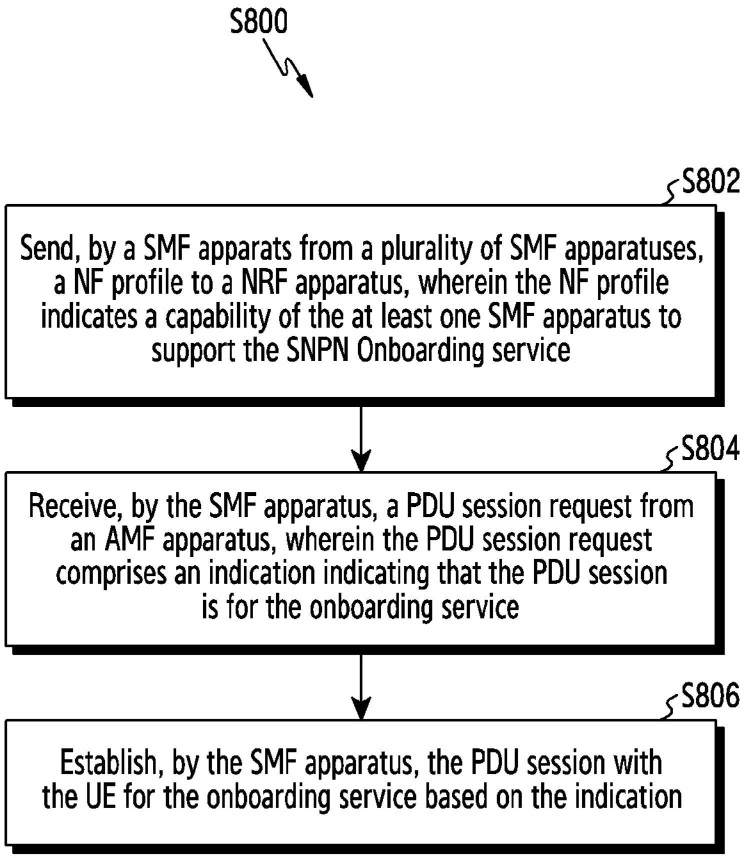

[Fig. 9]
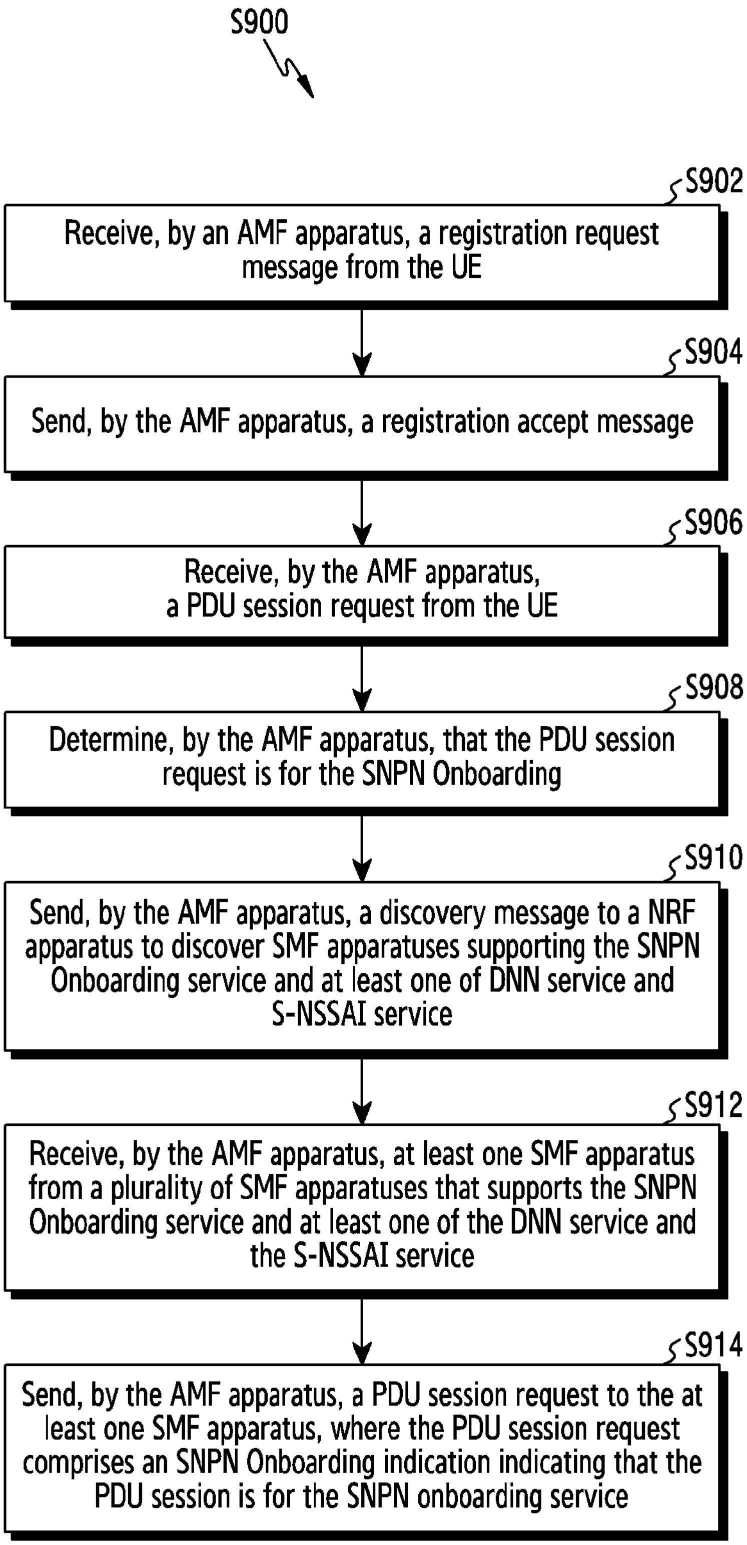

[Fig. 10]
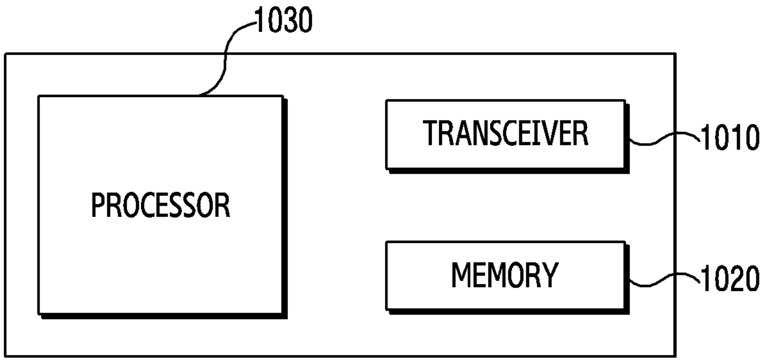
[Fig. 11]
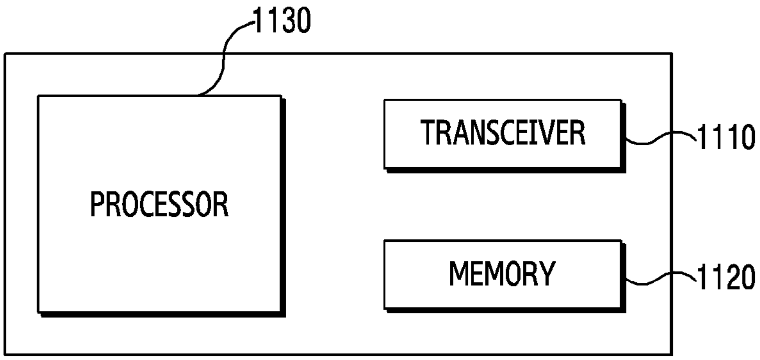

METHOD AND APPARATUS TO SELECT CORRECT SMF FOR SNPN UE'S ONBOARDING

PRIORITY

This application is a National Phase Entry of PCT International Application No. PCT/KR2022/011000, which was filed on Jul. 27, 2022, and claims priority to Indian Patents Application Nos. 202141033709 and 202141033709, which were filed on Jul. 27, 2021, and Apr. 22, 2022, respectively, the entire content of each of which is incorporated herein by reference.

TECHNICAL FIELD

The present disclosure relates to a field of Non-Public Networks in a 3rd Generation Partnership Project (3GPP), and more particularly related to a system and a method of ensuring that a correct session management function (SMF) apparatus is selected by access and mobility management function (AMF) apparatus during a stand-alone non-public network (SNPN) UE's onboarding to network.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is un-available, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The present disclosure provides a method, and an apparatus for selecting correct SMF for SNPN UE's onboarding in a wireless network.

Solution to Problem

According to an aspect of an exemplary embodiment, there is provided a communication method in a wireless communication.

Advantageous Effects of Invention

Aspects of the present disclosure provide efficient communication methods in a wireless communication system.

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIG. 1 is a representation of a sequence of events of that is expected to take place in a typical network deployment during SNPN UE's onboarding, when a SNPN is ON, according to the prior arts;

FIG. 2 is a representation of a sequence of events of that is expected to take place in a typical network deployment during SNPN UE's onboarding, when a PLMN is ON, according to the prior arts;

FIG. 3A is a sequence diagram illustrating a method for selecting correct SMF for SNPN onboarding of a UE, when the SNPN is ON, according to an embodiment as disclosed herein;

FIG. 3B is a sequence diagram illustrating a method for selecting correct SMF for SNPN onboarding of the UE, when the PLMN is ON, according to an embodiment as disclosed herein.

FIG. 4 shows various hardware components of a AMF apparatus, according to an embodiment as disclosed herein;

FIG. 5 shows various hardware components of a NRF apparatus, according to an embodiment as disclosed herein;

FIG. 6 shows various hardware components of a SMF apparatus, according to an embodiment as disclosed herein;

FIG. 7 is a flow chart illustrating a method, by implemented by the NRF apparatus, for selecting correct SMF for SNPN onboarding of a UE, according to an embodiment as disclosed herein;

FIG. 8 is a flow chart illustrating a method, by implemented by the SMF apparatus, for selecting correct SMF for SNPN onboarding of a UE, according to an embodiment as disclosed herein; and FIG. 9 is a flow chart illustrating a method, by implemented by the AMF apparatus, for selecting correct SMF for SNPN onboarding of a UE, according to an embodiment as disclosed herein.

FIG. 10 illustrates the configuration of a UE in a wireless communication system according to various embodiments.

FIG. 11 illustrates the configuration of a base station or a network entity in a wireless communication system according to various embodiments.

BEST MODE FOR CARRYING OUT THE INVENTION

Accordingly, the embodiment herein is to provide a method for selecting correct SMF for SNPN onboarding of a User Equipment (UE). The method includes receiving, by a Network Function Repository Function (NRF) apparatus, a NF profile from at least one Session Management Function (SMF) apparatus of a plurality of SMF apparatuses. The NF profile indicates a capability of the at least one SMF apparatus to support the SNPN Onboarding service. Further, the method includes receiving, by the NRF apparatus, a discovery message for SMF supporting the SNPN Onboarding service and at least one of DNN service and S-NSSAI service from an AMF apparatus. Further, the method includes selecting, by the NRF apparatus, the at least one apparatus of the plurality of SMF apparatuses supporting the SNPN Onboarding service and at least one of the DNN service and the S-NSSAI service based on the NF profile received from each SMF sever of the plurality of SMF apparatuses. Further, the method includes sending, by the NRF apparatus, the at least one selected SMF apparatus to the AMF apparatus.

Accordingly, the embodiment herein is to provide a method for selecting correct SMF for SNPN onboarding of a UE. The method includes receiving, by an AMF apparatus, a registration request message from the UE. Further, the method includes sending, by the AMF apparatus, a registration accept message and receiving, by the AMF apparatus, a PDU session request from the UE. Further, the method includes determining, by the AMF apparatus, that the PDU session request is for the SNPN Onboarding. Further, the method includes sending, by the AMF apparatus, a discovery message to a NRF apparatus to discover SMF apparatuses supporting the SNPN Onboarding service and at least one of DNN service and S-NSSAI service. Further, the method includes receiving, by the AMF apparatus, at least one SMF apparatus from a plurality of SMF apparatuses that supports the SNPN Onboarding service and at least one of the DNN service and the S-NSSAI service. Further, the method includes sending, by the AMF apparatus, a PDU session request to the at least one SMF apparatus, wherein the PDU session request comprises an SNPN Onboarding indication indicating that the PDU session is for the SNPN onboarding service.

In an embodiment, determining, by the AMF apparatus, that the PDU session request is for the SNPN Onboarding includes determining, the AMF apparatus, whether the PDU session request received from the UE comprises an SNPN Onboarding indication and determining, by the AMF apparatus, the PDU session request received from the UE is for the SNPN Onboarding in response to determining that the PDU session request received from the UE comprises the SNPN Onboarding indication.

In an embodiment, sending, by the AMF apparatus, the PDU session request to the at least one SMF apparatus comprises forwarding the SNPN Onboarding indication received in the PDU session request from the UE to the at least one SMF apparatus.

In an embodiment, determining, by the AMF apparatus, that the PDU session request is for the SNPN Onboarding includes determining, the AMF apparatus, whether the PDU session request received from the UE comprises an SNPN Onboarding indication, determining, the AMF apparatus, whether the registration request message received from the UE comprises a registration type information element (IE) set to the SNPN Onboarding in response to determining that the PDU session request received from the UE does not comprises the SNPN Onboarding indication, and determining, by the AMF apparatus, the PDU session request received from the UE is for the SNPN Onboarding in response to determining that the registration request message received from the UE comprises the registration type IE set to the SNPN Onboarding.

In an embodiment, sending, by the AMF apparatus, the PDU session request to the at least one SMF apparatus comprises creating, by the AMF apparatus, an SNPN Onboarding indication indicating that a PDU session is for the SNPN onboarding service in response to determining that the PDU session request received from the UE does not comprises the SNPN Onboarding indication, and sending, by the AMF apparatus, a PDU session request to the at least one SMF apparatus, wherein the PDU session request comprises an Onboarding indication indicating that the PDU session is for the SNPN onboarding service.

Accordingly, the embodiment herein is to provide a method for selecting correct SMF for SNPN onboarding of a UE. The method includes sending, by a SMF apparats from a plurality of SMF apparatuses, a NF profile to a NRF apparatus. The NF profile indicates a capability of the at least one SMF apparatus to support the SNPN Onboarding service. Further, the method includes receiving, by the SMF apparatus, a PDU session request from an AMF apparatus, wherein the PDU session request comprises an indication indicating that the PDU session is for the onboarding service. Further, the method includes establishing, by the SMF apparatus, the PDU session with the UE for the onboarding service based on the indication.

Accordingly, the embodiment herein is to provide a NRF apparatus for selecting correct SMF for SNPN onboarding of a UE. The NRF apparatus includes a SNPN Onboarding service controller communicatively connected to a memory and a processor. The SNPN Onboarding service controller is configured to receive a NF profile from at least one SMF apparatus of a plurality of SMF apparatuses. The NF profile indicates a capability of the at least one SMF apparatus to support the SNPN Onboarding service. The SNPN Onboarding service controller is configured to receive a discovery message for SMF supporting the SNPN Onboarding service and at least one of DNN service and S-NSSAI service from an AMF apparatus. Further, the SNPN Onboarding service controller is configured to select the at least one apparatus of the plurality of SMF apparatuses supporting the SNPN Onboarding service and at least one of the DNN service and the S-NSSAI service based on the NF profile received from each SMF sever of the plurality of SMF apparatuses. Further, the SNPN Onboarding service controller is configured to send the at least one selected SMF apparatus to the AMF apparatus.

Accordingly, the embodiment herein is to provide an AMF apparatus for selecting correct SMF for SNPN onboarding of a UE. The AMF apparatus includes a SNPN Onboarding service controller communicatively connected to a memory and a processor. The SNPN Onboarding service controller is configured to receive a registration request message from the UE and send a registration accept message. Further, the SNPN Onboarding service controller is configured to receive a PDU session request from the UE and determine that the PDU session request is for the SNPN Onboarding. Further, the SNPN Onboarding service controller is configured to send a discovery message to a NRF apparatus to discover Session Management Function (SMF) apparatuses supporting the SNPN Onboarding service and at least one of DNN service and S-NSSAI service. Further, the SNPN Onboarding service controller is configured to receive at least one SMF apparatus from a plurality of SMF apparatuses that supports the SNPN Onboarding service and at least one of the DNN service and the S-NSSAI service. Further, the SNPN Onboarding service controller is configured to send a PDU session request to the at least one SMF apparatus, where the PDU session request comprises an SNPN Onboarding indication indicating that the PDU session is for the SNPN onboarding service.

Accordingly, the embodiment herein is to provide a SMF apparats from a plurality of SMF apparatuses for selecting correct SMF for SNPN onboarding of a UE. The SMF apparats includes a SNPN Onboarding service controller communicatively connected to a memory and a processor. The SNPN Onboarding service controller is configured to send a NF profile to a NRF apparatus, where the NF profile indicates a capability of the at least one SMF apparatus to support the SNPN Onboarding service. Further, the SNPN Onboarding service controller is configured to receive a PDU session request from an AMF apparatus, wherein the PDU session request comprises an indication indicating that the PDU session is for the onboarding service. Further, the SNPN Onboarding service controller is configured to establish the PDU session with the UE for the onboarding service based on the indication.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

MODE FOR THE INVENTION

This application is based on and derives the benefit of Indian Provisional Application 202141033709 filed on 27 Jul. 2021, the contents of which are incorporated herein by reference.

A Non-public networks (NPN) are intended for the sole use of a private entity such as an enterprise, and may be deployed in a variety of configurations, utilising both virtual and physical elements. Specifically, they may be deployed as completely standalone networks, they may be hosted by a Public Land Mobile Network (PLMN), or they may be offered as a slice of the PLMN.

The NPN is a 5GS deployed for non-public use and technical specification (TS) 23.501 has details about the type of NPN deployment. The NPN is either:

a Stand-alone Non-Public Network (SNPN), i.e., operated by an NPN operator and not relying on network functions provided by the PLMN, or a Public Network Integrated NPN (PNI-NPN), i.e., a non-public network deployed with the support of a PLMN FIG. 1 is a representation of a sequence of events of that is expected to take place in a typical network deployment during SNPN UE's onboarding, when a SNPN is ON, according to the prior arts. At S102, the UE (100) is already registered and Registration Type is SNPN Onboarding. At S104, the UE (100) initiates the PDU session for the Onboarding. At S106, the AMF apparatus (200) performs the discovery for the SMF with DNN, S-NSSAI & onboarding. At S108, the NRF apparatus (300) is provided with the first SMF apparatus details and the second SMF apparatus details. At S110, the AMF apparatus (200) selects the first SMF apparatus (400) as it does not know which SMF supports onboarding. Hence, the onboarding is failed.

FIG. 2 is a representation of a sequence of events of that is expected to take place in a typical network deployment during SNPN UE's onboarding, when the PLMN is ON, according to the prior arts. At S202, the UE (100) is already registered and Registration Type is Initial Registration. At S204, the UE (100) initiates the PDU session for the Onboarding. At S206, the AMF apparatus (200) performs the discovery for the SMF with DNN, S-NSSAI & onboarding. At S208, the NRF apparatus (300) is provided with the first SMF apparatus details and the second SMF apparatus details. At S210, the AMF apparatus (200) selects the first SMF apparatus (400) as it does not know which SMF supports onboarding. Hence, the onboarding is failed.

It is desired to address the above mentioned disadvantages or other short comings or at least provide a useful alternative.

The principal object of the embodiments herein is to provide a method and an apparatus to select correct Session Management Function (SMF) for Stand-alone Non-Public Network (SNPN) User Equipment (UE's) onboarding.

Another object of the embodiments herein is to provide a proper discovery and selection of a SMF apparatus only for onboarding purpose in case existing Data Network Name (DNN) is used by an operator.

Another object of the embodiments herein is to provide an onboarding indication from an AMF apparatus to the SMF apparatus in a PDU session establishment request which will help the SMF apparatus to decide that the PDU session establishment request is for onboarding only. The AMF apparatus will use the onboarding indication as one criterion while discovering and selecting the SMF apparatus. The AMF apparatus will provide indication of onboarding while forwarding the PDU session request to the SMF apparatus. The onboarding indication for the SMF apparatus to differentiate the request between a normal service and an onboarding service.

Another object of the embodiments herein is to indicate, by the SMF apparatus, support for onboarding feature in its NF profile while registering with the SMF apparatus.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Below are the abbreviations used in the description:

AMF—Access and Mobility Management Function
UE—User Equipment
3gpp—3$^{rd}$ Generation Partnership Project
NSSAI—Network Slice Selection Assistance Information
S-NSSAI—Single-Network Slice Selection Assistance Information
PLMN—Public Land Mobile Network
TA—Tracking Area
RA—Registration Area
gNB—Next Generation NodeB
IE—Information Element
SMF—Session Management Function
NPN—Non-Public Network
SNPN—Stand-alone Non-Public Network
PNI—NPN-Public Integrated Non-Public Network
NRF—Network Repository Function
DNN—Data Network Name Accordingly, the embodiment herein is to provide method for selecting correct SMF for a SNPN onboarding of a UE. The method includes receiving, by a NRF apparatus, a NF profile from at least one SMF apparatus of a plurality of SMF apparatuses. The NF profile indicates a capability of the at least one SMF apparatus to support the SNPN Onboarding service. Further, the method includes receiving, by the NRF apparatus, a discovery message for SMF supporting the SNPN Onboarding service and at least one of DNN service and S-NSSAI service from an AMF apparatus. Further, the method includes selecting, by the NRF apparatus, the at least one apparatus of the plurality of SMF apparatuses supporting the SNPN Onboarding service and at least one of the DNN service and the S-NSSAI service based on the NF profile received from each SMF sever of the plurality of SMF apparatuses. Further, the method includes sending, by the NRF apparatus, the at least one selected SMF apparatus to the AMF apparatus.

Unlike to the conventional methods and systems, the proposed method is trying to address the problem explained (in the FIG. 1 and FIG. 2) which occurs when an operator decides to use existing DNN for the onboarding services. The proposed method provides the SMF apparatus which supports the onboarding service need to update with explicit indication while registering with the NRF apparatus. Further, the proposed method provides a method for AMF apparatus to discover the SMF apparatus by giving additional input of onboarding service. Also, the AMF apparatus indicates the PDU session for onboarding services to the SMF apparatus either after receiving from the onboarding UE in the PDU session establishment request or after finding the UE's registration context that the onboarding UE has initiated PDU session.

Referring now to the drawings and more particularly to FIGS. 3A through 9, where similar reference characters denote corresponding features consistently throughout the figures, there are shown preferred embodiments.

FIG. 3A is a sequence diagram illustrating a method for selecting correct SMF for SNPN onboarding of the UE (100), when the SNPN is ON, according to an embodiment as disclosed herein. The UE (100) can be, for example, but not limited to a laptop, a desktop computer, a notebook, a relay device, a Device-to-Device (D2D) device, a vehicle to everything (V2X) device, a smartphone, a tablet, an immersive device, and an internet of things (IoT) device. The proposed method is implemented in a wireless network (e.g., 5G network, a 6G network, an O-RAN network or the like).

In an embodiment, onboarding of UEs (100) for SNPNs allows the UE (100) to access an Onboarding Network (ONN) based on Default UE credentials for the purpose of provisioning the UE (100) with the SNPN credentials for primary authentication and other information to enable access to a desired SNPN, i.e. (re-)select and (re-)register with the SNPN. In order to provision SNPN credentials in the UE (100) that is configured with Default UE credentials, the UE (100) selects the SNPN as ONN and establishes a secure connection with that SNPN referred to as Onboarding SNPN (ON-SNPN).

Further, in order to provision SNPN credentials in the UE (100) that is equipped with a Universal Subscriber Identity Module (USIM) configured with default PLMN credentials, the UE (100) selects a PLMN as the ONN and establishes a secure connection with that PLMN. After the secure connection is established, the UE (100) is pro-visioned with the SNPN credentials and possibly other data to enable discovery, (re-)selection and (re-) registration for a desired SNPN. The ON-SNPN and SO-SNPN can be roles taken by either an SNPN or different SNPNs. It is possible for the same network to be in both roles with respect to a specific UE.

As explained in the TS 23.501, both Access Management and Mobility Function (AMF) apparatus (200) and Session Management Function (SMF) apparatus (400) plays an important role during this onboarding procedure. For this onboarding, a pre-configured S-NSSAI and DNN is used, so selecting a wrong AMF apparatus and/or SMF apparatus (400) will lead to failure of the UE's onboarding to network. Further, a radio access network (RAN) will choose the AMF apparatus (200) which supports the onboarding based on the configuration at the RAN. Similarly, the AMF apparatus (200) will select the correct SMF based on the pre-configured S-NSSAI & DNN as part of onboarding configuration at the AMF apparatus (200).

The SMF apparatus (400) which supports the onboarding procedure or provide onboarding services does specific work for onboarding like selecting UPF with the PDR and FAR. It may provide the provisioning server (PVS) address to the UE (100) as well. When dynamic PCC is not applied it takes care of handling the QoS parameters for this onboarding services.

This solution specified by the 3GPP will work only when the DNN is dedicated only for the onboarding services. But if the operator decides to use one of the existing DNN for onboarding purpose then this solution will not work. Because there will be many SMFs which support the DNN for providing the existing services (like existing Browsing services for Internet DNN) but not the onboarding service, so when the AMF apparatus (200) gets the SMF addresses from the NRF apparatus based on the S-NSSAI and DNN, it will get the SMF apparatus (400) which does not support onboarding service and AMF apparatus (200) might select the SMF apparatus (400). It will lead to the UE's onboarding failure to the network.

In case that the selected SMF provides other services than onboarding, there need some ways that the SMF apparatus (400) knows that the UE (100) is accessing for onboarding. Without any input to the SMF apparatus (400), it will lead to UE's onboarding failure.

Unlike to the conventional methods and systems, the proposed method is trying to address the problem explained (in the FIG. 1 and the FIG. 2) which occurs when an operator decides to use existing DNN for the onboarding services. The proposed method provides the SMF apparatus (400) which supports the onboarding service need to update with explicit indication while registering with the NRF apparatus (300). Also, the AMF apparatus (300) indicates the PDU session for onboarding services to the SMF apparatus (400) either after receiving from the onboarding UE (100) in the PDU session establishment request or after finding the UE's registration context that the onboarding UE has initiated PDU session.

Referring to the FIG. 3A, at S302*a*, the second SMF apparatus (400*b*) configures the support for onboarding while registering with the NRF apparatus (300). At S304*a*, the UE (100) is already registered and Registration Type is SNPN Onboarding. At S306*a*, the UE (100) initiates the PDU session for the Onboarding. At S308*a*, the AMF apparatus (200) performs the discovery for the SMF with DNN, S-NSSAI & onboarding. At S310*a*, the NRF apparatus (300) is provided with the second SMF apparatus details. At S312*a*, the AMF apparatus (200) selects the second SMF apparatus (400) with indication that the PDU session is for the onboarding service. Hence, the onboarding proceeded with correct SMF.

FIG. 3B is a sequence diagram illustrating a method for selecting correct SMF for SNPN onboarding of the UE (100), when the PLMN is ON, according to an embodiment as disclosed herein.

At S302*b*, the second SMF apparatus (400*b*) configures the support for onboarding while registering with the NRF apparatus (300). At S304*b*, the UE (100) is already registered and Registration Type is Initial Registration. At S306*b*, the UE (100) initiates the PDU session for the Onboarding with the onboarding indication. At S308*b*, the AMF apparatus (200) performs the discovery for the SMF with DNN, S-NSSAI & onboarding. At S310*b*, the NRF apparatus (300) is provided with the second SMF apparatus details. At S312*b*, the AMF apparatus (200) selects the second SMF apparatus (400) with indication that the PDU session is for the onboarding service. At S314*b*, the onboarding proceeded with correct SMF apparatus.

In an embodiment, it is proposed that when the SMF apparatus (400) is registering with the NRF apparatus (300). The SMF apparatus (400) explicitly indicates its support for onboarding services.

In an embodiment, when the AMF apparatus (200) does SMF discovery with the NRF apparatus (300), it considers onboarding services apart from S-NSSAI, DNN (i.e., onboarding indication) and other parameters mentioned in TS 23.501.

In an embodiment, the NRF apparatus (300) only sends the details of the SMF apparatus (400) which has support for onboarding and only authorized AMF apparatus (200) is able to discover and use the same service.

In an embodiment, the RAN is configured with sufficient data like support for onboarding services while selecting the AMF apparatus (200) during onboarding procedure (e.g., onboarding registration, PDU session establishment for onboarding, selecting a new AMF from the AMF set when the AMF handled the UE (100) get un-available etc.).

In an embodiment, the UE (100) provides onboarding indication in the SM NAS message (i.e., PDU Session establishment) to indicate the usage of the PDU session as onboarding services; or the AMF apparatus (200) includes an indication of onboarding service in N11 forwarding message to the selected SMF apparatus (400) when receiving the onboarding registered UE (100) sends the SM NAS message (i.e., PDU Session establishment).

In an embodiment, the AMF apparatus (200) provides the onboarding indication to the SMF apparatus via Nsmf_PDUSession_CreateSMContext request message when the PDU Session for remote provisioning of the UE (100) via user plane is established.

In an embodiment, if the target NF is the AMF apparatus or the SMF apparatus, the request may include the support of SNPN Onboarding to indicate whether the target NF instance supports SNPN Onboarding or not.

FIG. 4 shows various hardware components of the AMF apparatus (200), according to an embodiment as disclosed herein. In an embodiment, the AMF apparatus (200) includes a processor (210), a communicator (220), a memory (230), and a SNPN Onboarding service controller (240). The processor (210) is coupled with the communicator (220), the memory (230) and the SNPN Onboarding service controller (240).

The SNPN Onboarding service controller (240) is configured to receive the registration request message from the UE (100). Further, the SNPN Onboarding service controller (240) is configured to send a registration accept message and receive a PDU session request from the UE (100). Further, the SNPN Onboarding service controller (240) is configured to determine that the PDU session request is for the SNPN onboarding.

In an embodiment, the SNPN Onboarding service controller (240) is configured to determine whether the PDU session request received from the UE (100) includes the SNPN Onboarding indication. The SNPN Onboarding service controller (240) is configured to determine the PDU session request received from the UE (100) is for the SNPN Onboarding in response to determining that the PDU session request received from the UE (100) includes the SNPN Onboarding indication.

In another embodiment, the SNPN Onboarding service controller (240) is configured to determine whether the PDU session request received from the UE (100) includes an SNPN Onboarding indication. Further, the SNPN Onboarding service controller (240) is configured to determine whether the registration request message received from the UE (100) comprises a registration type information element (IE) set to the SNPN Onboarding in response to determining that the PDU session request received from the UE (100) does not comprises the SNPN Onboarding indication. Further, the SNPN Onboarding service controller (240) is configured to determine the PDU session request received from the UE (100) is for the SNPN Onboarding in response to determining that the registration request message received from the UE (100) comprises the registration type IE set to the SNPN Onboarding.

Further, the SNPN Onboarding service controller (240) is configured to send a discovery message to the NRF apparatus (300) to discover the SMF apparatuses (400*a* and 400*b*) supporting the SNPN onboarding service and the DNN service and the S-NSSAI service.

Further, the SNPN Onboarding service controller (240) is configured to receive the SMF apparatus from the plurality of SMF apparatuses (400*a* and 400*b*) that supports the SNPN Onboarding service and the DNN service and the S-NSSAI service. Further, the SNPN Onboarding service controller (240) is configured to send the PDU session request to the SMF apparatus. The PDU session request includes an SNPN onboarding indication indicating that the PDU session is for the SNPN onboarding service. In an embodiment, the PDU session request to the SMF apparatus (400) is sent by forwarding the SNPN Onboarding indication received in the PDU session request from the UE (100) to the SMF apparatus (400).

In another embodiment, the SNPN Onboarding service controller (240) is configured to create the SNPN indication indicating that the PDU session is for the SNPN onboarding service in response to determining that the PDU session request received from the UE (100) does not comprises the SNPN Onboarding indication. Further, the SNPN Onboarding service controller (240) is configured to send the PDU session request to the SMF apparatus (400). The PDU session request comprises an Onboarding indication indicating that the PDU session is for the SNPN onboarding service.

The SNPN Onboarding service controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 4 shows various hardware components of the AMF apparatus (200) but it is to be understood that other embodiments are not limited thereon. In other embodiments, the AMF apparatus (200) may include less or more number of components. Further, the labels or names of the components are used only for illustrative purpose and does not limit the scope of the invention. One or more components can be combined together to perform same or substantially similar function in the AMF apparatus (200).

FIG. 5 shows various hardware components of the NRF apparatus (300), according to an embodiment as disclosed herein. In an embodiment, the NRF apparatus (300) includes a processor (310), a communicator (320), a memory (330), and a SNPN Onboarding service controller (340). The processor (310) is coupled with the communicator (320), the memory (330) and the SNPN Onboarding service controller (340).

The SNPN Onboarding service controller (340) is configured to receive the NF profile from the SMF apparatus of the plurality of SMF apparatuses (400*a* and 400*b*). The NF profile indicates the capability of the SMF apparatus to support the SNPN onboarding service. Further, the SNPN Onboarding service controller (340) is configured to receive the discovery message for SMF supporting the SNPN Onboarding service and the DNN service and S-NSSAI service from the AMF apparatus (200). Based on the NF profile received from each SMF sever of the plurality of SMF apparatuses (400*a* and 400*b*), the SNPN Onboarding service controller (340) is configured to select the apparatus of the plurality of SMF apparatuses (400*a* and 400*b*) supporting the SNPN Onboarding service and the DNN service and the S-NSSAI service. Further, the SNPN Onboarding service controller (340) is configured to send the selected SMF apparatus to the AMF apparatus (200).

The SNPN Onboarding service controller (340) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

Although the FIG. 5 shows various hardware components of the NRF apparatus (300) but it is to be understood that other embodiments are not limited thereon. In other embodiments, the NRF apparatus (300) may include less or more number of components. Further, the labels or names of the components are used only for illustrative purpose and does not limit the scope of the invention. One or more components can be combined together to perform same or substantially similar function in the NRF apparatus (300).

FIG. 6 shows various hardware components of the SMF apparatus (400), according to an embodiment as disclosed herein. In an embodiment, the SMF apparatus (400) includes a processor (410), a communicator (420), a memory (430), and a SNPN Onboarding service controller (440). The processor (410) is coupled with the communicator (420), the memory (430) and the SNPN Onboarding service controller (440).

The SNPN Onboarding service controller (440) is configured to send the NF profile to the NRF apparatus (300). The NF profile indicates the capability of the SMF apparatus to support the SNPN Onboarding service. Further, the SNPN Onboarding service controller (440) is configured to receive the PDU session request from the AMF apparatus (200). The PDU session request includes the indication indicating that the PDU session is for the onboarding service. Based on the indication, the SNPN Onboarding service controller (440) is configured to establish the PDU session with the UE (100) for the onboarding service.

The SNPN Onboarding service controller (440) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (410) is configured to execute instructions stored in the memory (430) and to perform various processes. The communicator (420) is configured for communicating internally between internal hardware components and with external devices via one or more networks. The memory (430) also stores instructions to be executed by the processor (410). The memory (430) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In certain examples, a non-transitory storage medium may store data that can, over time, change (e.g., in Random Access Memory (RAM) or cache).

Although the FIG. 6 shows various hardware components of the SMF apparatus (400) but it is to be understood that other embodiments are not limited thereon. In other embodiments, the SMF apparatus (400) may include less or more number of components. Further, the labels or names of the components are used only for illustrative purpose and does not limit the scope of the invention. One or more components can be combined together to perform same or substantially similar function in the SMF apparatus (400).

FIG. 7 is a flow chart (S700) illustrating a method, by implemented by the NRF apparatus (300), for selecting correct SMF for SNPN onboarding of the UE (100), according to an embodiment as disclosed herein. The operations (S702-S708) are performed by the SNPN Onboarding service controller (340).

At S702, the method includes receiving the NF profile from the at least one SMF apparatus of the plurality of SMF apparatuses (400*a* and 400*b*). The NF profile indicates the capability of the at least one SMF apparatus to support the SNPN Onboarding service. At S704, the method includes receiving the discovery message for the SMF supporting the SNPN Onboarding service and the DNN service and the S-NSSAI service from the AMF apparatus (200). At S706, the method includes selecting the apparatus of the plurality of SMF apparatuses (400*a* and 400*b*) supporting the SNPN Onboarding service and the DNN service and the S-NSSAI service based on the NF profile received from each SMF sever of the plurality of SMF apparatuses (400*a* and 400*b*). At S708, the method includes sending the selected SMF apparatus to the AMF apparatus (200).

FIG. 8 is a flow chart (S800) illustrating a method, by implemented by the SMF apparatus (400), for selecting correct SMF for SNPN onboarding of the UE (100), according to an embodiment as disclosed herein. The operations (S802-S806) are performed by the SNPN Onboarding service controller (440).

At S802, the method includes sending the NF profile to the NRF apparatus (300), where the NF profile indicates the capability of the SMF apparatus to support the SNPN Onboarding service. At S804, the method includes receiving the PDU session request from the AMF apparatus (200). The PDU session request includes the indication indicating that the PDU session is for the onboarding service. At S806, the method includes establishing the PDU session with the UE (100) for the onboarding service based on the indication.

FIG. 9 is a flow chart (S900) illustrating a method, by implemented by the AMF apparatus (200), for selecting correct SMF for SNPN onboarding of the UE (100), according to an embodiment as disclosed herein. The operations (S902-S914) are performed by the SNPN Onboarding service controller (240).

At S902, the method includes receiving the registration request message from the UE (100). At S904, the method includes sending the registration accept message. At S906, the method includes receiving the PDU session request from the UE (100). At S908, the method includes determining that the PDU session request is for the SNPN Onboarding. At S910, the method includes sending the discovery message to the NRF apparatus (300) to discover the SMF apparatuses (400*a* and 400*b*) supporting the SNPN Onboarding service and the DNN service and the S-NSSAI service.

At S912, the method includes receiving the SMF apparatus from the plurality of SMF apparatuses (400*a* and 400*b*) that supports the SNPN Onboarding service and the DNN service and the S-NSSAI service. At S914, the method includes sending the PDU session request to the SMF apparatus. The PDU session request includes SNPN Onboarding indication indicating that the PDU session is for the SNPN onboarding service.

FIG. 10 is a block diagram of an internal configuration of a UE, according to an embodiment.

As shown in FIG. 10, the UE according to an embodiment may include a transceiver 1010, a memory 1020, and a processor 1030. The transceiver 1010, the memory 1020, and the processor 1030 of the UE may operate according to a communication method of the UE described above. However, the components of the UE are not limited thereto. For example, the UE may include more or fewer components than those described above. In addition, the processor 1030, the transceiver 1010, and the memory 1020 may be implemented as a single chip. Also, the processor 1030 may include at least one processor.

Furthermore, the UE of FIG. 10 corresponds to the UE 100 in FIGS. 1 to 9.

The transceiver 1010 collectively refers to a UE receiver and a UE transmitter, and may transmit/receive a signal to/from a base station or a network entity. The signal transmitted or received to or from the base station or a network entity may include control information and data. The transceiver 1010 may include a RF transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the UE. Also, the memory 1020 may store control information or data included in a signal obtained by the UE. The memory 1020 may be a storage medium, such as read-only memory (ROM), random access memory (RAM), a hard disk, a CD-ROM, and a DVD, or a combination of storage media.

The processor 1030 may control a series of processes such that the UE operates as described above. For example, the transceiver 1010 may receive a data signal including a control signal transmitted by the base station or the network entity, and the processor 1030 may determine a result of receiving the control signal and the data signal transmitted by the base station or the network entity.

FIG. 11 is a block diagram of an internal configuration of a base station or a network entity, according to an embodiment.

As shown in FIG. 11, the base station or the network entity according to an embodiment may include a transceiver 1110, a memory 1120, and a processor 1130. The transceiver 1110, the memory 1120, and the processor 1130 of the base station or the network entity may operate according to a communication method of the base station or the network entity described above. However, the components of the base station or the network entity are not limited thereto. For example, the base station or the network entity may include more or fewer components than those described above. In addition, the processor 1130, the transceiver 1110, and the memory 1120 may be implemented as a single chip. Also, the processor 1130 may include at least one processor.

Furthermore, the network entity of the FIG. 11 corresponds to the AMF apparatus 200 of FIG. 4, the NRF apparatus 300 of FIG. 5, and the SMF apparatus 400 of FIG. 6. In addition, the network entity of the FIG. 11 corresponds to the AMF apparatus 200 (or AMF), the NRF apparatus 300 (or NRF), and the SMF apparatus 400 (or SMF) in FIGS. 1 to 9.

The transceiver 1110 collectively refers to the base station (or the network entity receiver) and a base station (or the network entity) transmitter, and may transmit/receive a signal to/from a terminal or a network entity or a base station. The signal transmitted or received to or from the terminal or a network entity or the base station may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the base station or the network entity. Also, the memory 1120 may store control information or data included in a signal obtained by the base station or the network entity. The memory 1120 may be a storage medium, such as read-only memory (ROM), random access memory (RAM), a hard disk, a CD-ROM, and a DVD, or a combination of storage media.

The processor 1130 may control a series of processes such that the base station or the network entity operates as described above. For example, the transceiver 1110 may receive a data signal including a control signal transmitted by the terminal or the network entity or the base station, and the processor 1130 may determine a result of receiving the control signal and the data signal transmitted by the terminal or the network entity or the base station.

According to various embodiments, A method for selecting Session Management Function (SMF) for Stand-alone Non-Public Network (SNPN) onboarding of a User Equipment (UE) (100), wherein the method comprises receiving, by a Network Repository Function (NRF) apparatus (300), a NF profile from at least one SMF apparatus of a plurality of SMF apparatuses (400*a* and 400*b*), wherein the NF profile indicates a capability of the at least one SMF apparatus to support the SNPN Onboarding service. Wherein the method comprises receiving, by the NRF apparatus (300), a discovery message for SMF supporting the SNPN Onboarding service and at least one of Data Network Name (DNN) service and Single Network Slice Selection Assistance information (S-NSSAI) service from an Access and Mobility Management Function (AMF) apparatus (200). Wherein the method comprises selecting, by the NRF apparatus (300), the at least one apparatus of the plurality of SMF apparatuses (400*a* and 400*b*) supporting the SNPN Onboarding service and at least one of the DNN service and the S-NSSAI service based on the NF profile received from each SMF sever of the plurality of SMF apparatuses (400*a* and 400*b*). And, wherein the method comprises sending, by the NRF apparatus (300), the at least one selected SMF apparatus to the AMF apparatus (200).

According to various embodiments, A method for selecting Session Management Function (SMF) for Stand-alone Non-Public Network (SNPN) onboarding of a User Equipment (UE) (100), wherein the method comprises receiving, by an Access and Mobility Management Function (AMF) apparatus (200), a registration request message from the UE (100). Wherein the method comprises sending, by the AMF apparatus (200), a registration accept message. Wherein the method comprises receiving, by the AMF apparatus (200), a PDU session request from the UE (100). Wherein the method comprises determining, by the AMF apparatus (200), that the PDU session request is for the SNPN Onboarding. Wherein the method comprises sending, by the AMF apparatus (200), a discovery message to a Network Function Repository Function (NRF) apparatus (300) to discover SMF apparatuses (400*a* and 400*b*) supporting the SNPN Onboarding service and at least one of Data Network Name (DNN) service and Single Network Slice Selection Assistance information (S-NSSAI) service. Wherein the method comprises receiving, by the AMF apparatus (200), at least one SMF apparatus from a plurality of SMF apparatuses (400*a* and 400*b*) that supports the SNPN Onboarding service and at least one of the DNN service and the S-NSSAI service. And, wherein the method comprises sending, by the AMF apparatus (200), a PDU session request to the at least one SMF apparatus, wherein the PDU session request comprises an SNPN Onboarding indication indicating that the PDU session is for the SNPN onboarding service.

In some embodiments, wherein determining, by the AMF apparatus (200), that the PDU session request is for the SNPN Onboarding comprises: determining, the AMF apparatus (200), whether the PDU session request received from the UE (100) comprises an SNPN Onboarding indication; and determining, by the AMF apparatus (200), the PDU session request received from the UE (100) is for the SNPN Onboarding in response to determining that the PDU session request received from the UE (100) comprises the SNPN Onboarding indication.

In some embodiments, wherein sending, by the AMF apparatus (200), the PDU session request to the at least one SMF apparatus comprises forwarding the SNPN Onboarding indication received in the PDU session request from the UE (100) to the at least one SMF apparatus.

In some embodiments, wherein determining, by the AMF apparatus (200), that the PDU session request is for the SNPN Onboarding comprises: determining, the AMF apparatus (200), whether the PDU session request received from the UE (100) comprises an SNPN Onboarding indication; determining, the AMF apparatus (200), whether the registration request message received from the UE (100) comprises a registration type information element (IE) set to the SNPN Onboarding in response to determining that the PDU session request received from the UE (100) does not comprises the SNPN Onboarding indication; and determining, by the AMF apparatus (200), the PDU session request received from the UE (100) is for the SNPN Onboarding in response to determining that the registration request message received from the UE (100) comprises the registration type IE set to the SNPN Onboarding.

In some embodiments, wherein sending, by the AMF apparatus (200), the PDU session request to the at least one SMF apparatus comprises: creating, by the AMF apparatus (200), an SNPN Onboarding indication indicating that a PDU session is for the SNPN onboarding service in response to determining that the PDU session request received from the UE (100) does not comprises the SNPN Onboarding indication; and sending, by the AMF apparatus (200), a PDU session request to the at least one SMF apparatus, wherein the PDU session request comprises an Onboarding indication indicating that the PDU session is for the SNPN onboarding service.

According to various embodiments, a method for selecting Session Management Function (SMF) for Stand-alone Non-Public Network (SNPN) onboarding of a User Equipment (UE) (100), wherein the method comprises: sending, by a SMF apparatus from a plurality of SMF apparatuses (400*a* and 400*b*), a NF profile to a Network Function Repository Function (NRF) apparatus (300), wherein the NF profile indicates a capability of the at least one SMF apparatus to support the SNPN Onboarding service; receiving, by the SMF apparatus, a PDU session request from an AMF apparatus (200), wherein the PDU session request comprises an indication indicating that the PDU session is for the onboarding service; and establishing, by the SMF apparatus, the PDU session with the UE (100) for the onboarding service based on the indication.

According to various embodiments, a Network Function Repository Function (NRF) apparatus (300) for selecting correct SMF for Stand-alone Non-Public Network (SNPN) onboarding of a User Equipment (UE) (100), wherein the NRF apparatus (300) comprises: a memory (330); a processor (310); and a SNPN Onboarding service controller (340), communicatively connected to the memory (330) and the processor (310), configured to: receive a NF profile from at least one Session Management Function (SMF) apparatus of a plurality of SMF apparatuses (400*a* and 400*b*), wherein the NF profile indicates a capability of the at least one SMF apparatus to support the SNPN Onboarding service; receive a discovery message for SMF supporting the SNPN Onboarding service and at least one of Data Network Name (DNN) service and Single Network Slice Selection Assistance information (S-NSSAI) service from an Access and Mobility Management Function (AMF) apparatus (200); select the at least one apparatus of the plurality of SMF apparatuses (400*a* and 400*b*) supporting the SNPN Onboarding service and at least one of the DNN service and the S-NSSAI service based on the NF profile received from each SMF sever of the plurality of SMF apparatuses (400*a* and 400*b*); and send the at least one selected SMF apparatus to the AMF apparatus (200).

According to various embodiments, An Access and Mobility Management Function (AMF) apparatus (200) for selecting correct SMF for Stand-alone Non-Public Network (SNPN) onboarding of a User Equipment (UE) (100), wherein the AMF apparatus (200) comprises: a memory (230); a processor (210); and a SNPN Onboarding service controller (240), communicatively connected to the memory (230) and the processor (210), configured to: receive a registration request message from the UE (100); send a registration accept message; receive a PDU session request from the UE (100); determine that the PDU session request is for the SNPN Onboarding; send a discovery message to a Network Function Repository Function (NRF) apparatus (300) to discover Session Management Function (SMF) apparatuses (400*a* and 400*b*) supporting the SNPN Onboarding service and at least one of Data Network Name (DNN) service and Single Network Slice Selection Assistance information (S-NSSAI) service; receive at least one SMF apparatus from a plurality of SMF apparatuses (400*a* and 400*b*) that supports the SNPN Onboarding service and at least one of the DNN service and the S-NSSAI service; and send a PDU session request to the at least one SMF apparatus, wherein the PDU session request comprises an SNPN Onboarding indication indicating that the PDU session is for the SNPN onboarding service.

In some embodiments, wherein determine that the PDU session request is for the SNPN Onboarding comprises: determine whether the PDU session request received from the UE (100) comprises an SNPN Onboarding indication; and determine the PDU session request received from the UE (100) is for the SNPN Onboarding in response to determining that the PDU session request received from the UE (100) comprises the SNPN Onboarding indication.

In some embodiments, wherein send the PDU session request to the at least one SMF apparatus comprises forwarding the SNPN Onboarding indication received in the PDU session request from the UE (100) to the at least one SMF apparatus.

In some embodiments, wherein determine that the PDU session request is for the SNPN Onboarding comprises: determine whether the PDU session request received from the UE (100) comprises an SNPN Onboarding indication; determine whether the registration request message received from the UE (100) comprises a registration type information element (IE) set to the SNPN Onboarding in response to determining that the PDU session request received from the UE (100) does not comprises the SNPN Onboarding indication; and determine the PDU session request received from the UE (100) is for the SNPN Onboarding in response to determining that the registration request message received from the UE (100) comprises the registration type IE set to the SNPN Onboarding.

In some embodiments, wherein send the PDU session request to the at least one SMF apparatus comprises: create an SNPN Onboarding indication indicating that a PDU session is for the SNPN onboarding service in response to determining that the PDU session request received from the UE (100) does not comprises the SNPN Onboarding indication; and send a PDU session request to the at least one SMF apparatus, wherein the PDU session request comprises an Onboarding indication indicating that the PDU session is for the SNPN onboarding service.

According to various embodiments, a SMF apparats from a plurality of SMF apparatuses (400*a* and 400*b*) for selecting correct SMF for Stand-alone Non-Public Network (SNPN) onboarding of a User Equipment (UE) (100), wherein the SMF apparats comprises: a memory (430); a processor (410); and a SNPN Onboarding service controller (440), communicatively connected to the memory (430) and the processor (410), configured to: send a NF profile to a Network Function Repository Function (NRF) apparatus (300), wherein the NF profile indicates a capability of the at least one SMF apparatus to support the SNPN Onboarding service; receive a PDU session request from an AMF apparatus (200), wherein the PDU session request comprises an indication indicating that the PDU session is for the onboarding service; and establish the PDU session with the UE (100) for the onboarding service based on the indication.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a session management function (SMF) entity, the method comprising:

transmitting, to a network repository function (NRF) entity, a registration message for configuring an onboarding service;

receiving, from an access and mobility management function (AMF) entity, a request message including an indication that a protocol data unit (PDU) session of a user equipment (UE) is for the onboarding service; and proceeding the PDU session of the UE for the onboarding service.

2. The method of claim 1, wherein the registration message indicates support for the onboarding service for a stand-alone non-public network (SNPN).

3. The method of claim 1, wherein the request message is transmitted through an N11 message.

4. The method of claim 1, wherein the SMF entity is one of a plurality of SMF entities.

5. The method of claim 4, wherein a first part of the plurality of SMF entities supports the onboarding service, and wherein a second part of the plurality of SMF entities supports another service without the onboarding service.

6. A method performed by an access and mobility management function (AMF) entity, the method comprising:

receiving, from a user equipment (UE), a protocol data unit (PDU) session establishment message;

transmitting, to a network repository function (NRF) entity, a first message for discovering a session management function (SMF) entity, the first message including a single network slice selection assistance information (S-NSSAI) and a data network name (DNN);

receiving, from the NRF entity, a second message including information on a capability of the SMF entity related to onboarding service;

performing a selection of the SMF entity based on the S-NSSAI, the DNN, and the information on the capability of the SMF entity related to onboarding service; and transmitting, to the SMF entity, a third message including an indication of onboarding service.

7. The method of claim 6, wherein the onboarding service is for a stand-alone non-public network (SNPN).

8. The method of claim 6, wherein the PDU session establishment message includes information associated with the onboarding service.

9. The method of claim 6, wherein the SMF entity is one of a plurality of SMF entities.

10. The method of claim 9, wherein a first part of the plurality of SMF entities supports the onboarding service, and wherein a second part of the plurality of SMF entities supports another service without the onboarding service.

11. A session management function (SMF) entity comprising:

at least one transceiver;

at least one processor communicatively coupled to the at least one transceiver; and at least one memory, communicatively coupled to the at least one processor, storing instructions executable by the at least one processor individually or in any combination to cause the SMF entity to:

transmit, to a network repository function (NRF) entity, a registration message for configuring an onboarding service;

receive, from an access and mobility management function (AMF) entity, a request message including an indication that a protocol data unit (PDU) session of a user equipment (UE) is for the onboarding service, and proceed the PDU session of the UE for the onboarding service.

12. The SMF entity of claim 11, wherein the registration message indicates support for the onboarding service for a stand-alone non-public network (SNPN).

13. An access and mobility management function (AMF) entity comprising:

at least one transceiver;

at least one processor communicatively coupled to the at least one transceiver; and at least one memory, communicatively coupled to the at least one processor, storing instructions executable by the at least one processor individually or in any combination to cause the AMF entity to:

receive, from a user equipment (UE), a protocol data unit (PDU) session establishment message;

transmit, to a network repository function (NRF) entity, a first message for discovering a session management function (SMF) entity, the first message including a single network slice selection assistance information (S-NSSAI) and a data network name (DNN);

receive, from the NRF entity, a second message including information on a capability of the SMF entity related to onboarding service;

perform a selection of the SMF entity based on the S-NSSAI, the DNN, and the information on a capability of the SMF entity related to onboarding service; and transmit, to the SMF entity, a third message including an indication of onboarding service.

14. The AMF entity of claim 13, wherein the onboarding service is for a stand-alone non-public network (SNPN).

15. The AMF entity of claim 13, wherein the PDU session establishment message includes information associated with the onboarding service.

* * * * *